(12) United States Patent
Russomagno et al.

(10) Patent No.: US 7,328,997 B2
(45) Date of Patent: Feb. 12, 2008

(54) TRAINING AID USING VISION RESTRICTION AND METHOD OF USE

(75) Inventors: Vincent J. Russomagno, Centerville, DE (US); David S. Foulke, North Wales, PA (US)

(73) Assignees: St. Moritz Limited Partnership, Centerville, DE (US); Penllyn Limited Partnership, Spring House, PA (US)

( * ) Notice: Subject to any disclaimer, the term of this patent is extended or adjusted under 35 U.S.C. 154(b) by 87 days.

(21) Appl. No.: 11/113,796

(22) Filed: Apr. 25, 2005

(65) Prior Publication Data

US 2005/0190341 A1    Sep. 1, 2005

Related U.S. Application Data

(63) Continuation-in-part of application No. 10/747,845, filed on Dec. 29, 2003, now Pat. No. 6,942,336.

(51) Int. Cl.
*G02C 7/16*    (2006.01)

(52) U.S. Cl. .......................... 351/45; 351/46

(58) Field of Classification Search .................. 351/45, 351/46, 44, 41, 47, 48, 57, 158
See application file for complete search history.

(56) References Cited

U.S. PATENT DOCUMENTS 1,637,406 A * 8/1927 Brumder ...................... 473/210
3,628,854 A * 12/1971 Jampolsky .................. 351/175

* cited by examiner

*Primary Examiner*—Hung Xuan Dang
(74) *Attorney, Agent, or Firm*—Howson & Howson LLP (57) ABSTRACT

Opaque films adhering electrostatically to lenses of eyewear, are used to train baseball fielders and golfers. For baseball, the films, placed on the lower parts of the lenses establish opaque areas which encourage the player to follow a ball visually throughout its entire path of travel toward the player's glove. The opaque areas may have a convex upper edge or a concave upper edge. In the latter case, the training aid can be used, without modification to train the player in batting. For golf an opaque film covers one lens, and an opaque film having a lenticular transparent opening in its upper part is placed on the other lens. The films encourage the golfer to keep his or her head down and behind the ball during the downswing.

2 Claims, 4 Drawing Sheets

TRAINING AID USING VISION RESTRICTION AND METHOD OF USE

CROSS-REFERENCE TO RELATED APPLICATIONS

This application is a continuation-in-part of our application Ser. No. 10/747,845, filed Dec. 29, 2003, now U.S. Pat. No. 6,942,336.

FIELD OF THE INVENTION

This invention relates to improvements in training for sports, and particular to vision-restricting eyewear for training of individuals in fielding and batting baseballs and softballs, and in swinging a golf club.

BACKGROUND OF THE INVENTION

One of the problems commonly encountered in training a baseball player, especially a young, inexperienced player, is that, when fielding line drives and ground balls, he or she has a tendency to watch the batter while tracking the ball in the lower part of the visual field. As the ball approaches the glove, the fielder loses sight of the ball, and will frequently be unable to catch it. On occasion, the ball will strike an unprotected part of the fielder's body, causing injury.

Losing sight of the ball is a major cause of fielding errors by young players, and has been difficult to correct, even with intensive coaching. The problem is experienced not only by infielders and pitchers in fielding ground balls and line drives, but also by outfielders attempting to retrieve ground balls, by first basemen and other infielders attempting to catch low throws, and by catchers when attempting to catch a low pitch or a throw from another player made while a runner is approaching from third base.

In batting, another problem is encountered. Unless trained otherwise, batters have a tendency to tilt their heads in such a way that their two eyes are at different levels. That is, a right-hand batter will tend to tilt his or her head to the right while awaiting a pitch, and a left-hand batter will tend to tilt his or her head to the left. This tendency to tilt the head, frequently referred to by the term "pillow head," interferes with the batter's ability to hit a pitched ball. Coaches have found through experience that a ball can be hit more effectively and consistently when the batter's head is held upright.

For amateur golfers, one of the two most common causes of poor hitting is looking up before the swing is finished. Another cause of poor hitting is moving the head forward of the ball. Golf professionals teach that a player's head must stay "behind the ball". That is, the player's head must face a location behind the ball at the time of impact. By observing these rules consistently, professional golfers avoid fading and slicing.

In golf, keeping one's eyes on the ball is important, but by itself it does not solve the problem of fading and slicing. Since the eyes are not stationary in the head, it is possible to focus on the ball while rotating the head forward of the ball in the direction of the target during the downswing. The result is a slice or a fade.

The player will not necessarily be aware of a forward head movement. Often, the only way the player will know that his or her head moved forward is by observing the shot go to the right or left, or by being told of the head movement by a careful observer.

BRIEF SUMMARY OF THE INVENTION

A general object of this invention is to provide training aids that address the above-mentioned problems in fielding and batting in baseball and softball, and in swinging a golf club. Another object of this invention is to provide simple, convenient, easily used, and effective, devices for training baseball and softball players, or golfers.

In baseball, the invention trains fielders to keep their eyes on the ball at the critical time, and one embodiment of the invention can be used to train fielders and also, without modification, to train batters to keep their heads erect, and their eyes level, while swinging.

An object of another embodiment of the invention is to train golfers both to keep their heads down and also to keep their heads behind the ball during the downswing.

Still another object of the invention is to provide more effective training methods both in baseball and in golf.

The training aid in accordance with one aspect of the invention preferably comprises an eyeglass frame having a pair of transparent lenses, each lens having an upper and lower region, and an opaque layer of film adhering to each of the transparent lenses and covering at least part of the lower region of at least one of the lenses while leaving at least a portion of the upper region thereof uncovered and transparent.

For baseball fielding, the opaque layer of film on each lens covers at least part of the lower region thereof while leaving the upper region thereof uncovered and transparent.

The opaque layers are peelable from the lenses and adhere to the lenses by electrostatic attraction. The lower edge of each film layer conforms in shape to, and coincides with, the lower edge of the lens to which it adheres.

Each film layer has an upper edge extending across substantially the entire width thereof. In the case of a training aid for baseball fielders, the upper edge may be convex upwardly, so that the film layers obscure a portion of the central part of the visual field that is vertically higher than the obscured portions of the left and right portions of the visual field. In the baseball fielding training aid, a plurality of pairs of opaque layers of film may be supported on a backing layer and peelable therefrom. In each of the opaque films, the radii of curvature of all portions of the downwardly convex lower edge are greater than the radii of curvature of all portions of the upwardly convex upper edge thereof.

Preferably, where plural pairs of opaque film layers are provided on a backing sheet, the pairs of opaque film layers are provided in different sizes. Thus, the height and width of each of the opaque film layers of one of the pairs are greater respectively than the height and width of each of the opaque film layers of another of the pairs.

The plurality of pairs of opaque layers are preferably provided in a kit in combination with an eyeglass frame having a pair of transparent lenses and the lower edges of the opaque layers of film of each pair conform in shape respectively to the lower edges of the transparent lenses.

In training an individual in fielding, baseballs are repeatedly projected at, and caught by, the individual in a glove while the central part of the lower portion of the individual's field of vision is obscured. As a result, the individual is trained to follow each baseball visually along the entire path of travel of the baseball to the glove.

In this version of the baseball fielder's training aid, where the upper edges of the opaque film layers are convex, parts of the individual's field of vision to the right and left of the central part of the lower portion of the individual's field of vision are also obscured, but the heights of the obscured right and left parts of the individual's field of vision are less than the height of the obscured central part of the individual's field of vision. After baseballs are repeatedly projected at, and caught by, the individual while the central part of the lower portion of the individual's field of vision is obscured, the height and/or width of the obscured central part of the individual's field of vision may be reduced, and further baseballs may then be repeatedly projected at, and caught by, the individual while the obscured central part of the individual's field of vision is obscured to a reduced height and/or width. The height and width of the obscured part of the field of vision can be reduced by reducing the height of the obscured central part of the lower portion of the individual's field of vision and the obscured parts of the individual's field of vision to the right and left of the central part.

The training aid and method in accordance with the invention have been found effective in teaching baseball players at all positions to field ground balls and line drives.

For golf, the opaque layer of film on at least one of the lenses covers substantially the entire width of the lower region, and right and left portions of the upper region thereof. Preferably for a right-handed golfer, the film covers the entire right lens, making it completely opaque, while the film on the left lens covers the lower region of the lens from right to left, and right and left portions of the upper region, the film having a lenticular-shaped, transparent, opening between the right and left portions. Thus, left and right portions of the field of vision of the golfer's eye nearest the target are obscured while a central part of said field of vision between the left and right portions remains unobscured. The width of the unobscured central part of said field of vision in a lower region thereof is narrower than the width of the unobscured central part of said field of vision in an intermediate region between an upper region thereof and said lower region thereof.

The lenticular-shaped, transparent, opening requires the golfer to keep his or her head down in order to see the ball (on the ground or on a tee), and causes the ball to disappear from view upon a relatively slight head movement to the right or left, thereby also encouraging the golfer to keep his or her head behind the ball.

Another object of this invention is to provide a baseball and softball training aid that addresses simultaneously both the problem of keeping a fielder's head down while fielding ground balls, and the problem of keeping a batters head erect, and eyes level, while swinging. A preferred embodiment of the training aid can be used without modification by an individual both when fielding and when batting.

In accordance with the last-mentioned aspect of the invention, the training aid comprises an eyeglass frame having a pair of lenses, each lens having a transparent upper region and an opaque lower region. The opaque lower region of each of the lenses has a concave upper boundary at which it meets the transparent upper region of the lens. Because of the concavity of the upper boundaries of the opaque regions, the sides of the visual field of the user of the training aid are occluded to a greater degree than the central part of the user's visual field.

In the preferred embodiment, the upper boundary of the opaque lower region of each of the lenses has a smooth concave curvature, and a central part of the upper boundary of the opaque lower region of each of the lenses should be at least one-half centimeter, and preferably approximately one centimeter, below an imaginary straight line extending from one end of the upper boundary to the other end thereof.

Preferably the lowermost parts of the upper boundaries of the opaque lower regions of the lenses are at a height such that when the head of an individual wearing the training aid is held erect, the central part of the individual's visual field is obscured at angles greater than about 9° to 15° below a horizontal plane at the level of the individual's eyes, until he tilts his head down.

Preferably, each of the lenses comprises a rigid, transparent material having inner and outer faces, and the lower region of each of the lenses is rendered opaque by an opaque film adhering to a lower portion of one of its inner and outer faces.

The transparent upper region of each of the lenses is also preferably tinted so that the training aid also functions as a pair of sunglasses.

Another aspect of the invention resides in a method of training an individual in fielding and hitting baseballs or softballs. In accordance with this aspect of the invention, a training aid as described above is positioned on an individual's face with the lowermost parts of the upper boundaries of the opaque lower regions of the lenses at a height such that, when the individual is standing on a level playing field and the individual's head is held erect and stationary, the individual can see, in the central part of the visual field, portions of the playing field more than approximately twenty-five feet from the individual's feet, but is prevented from seeing portions of the playing field less than approximately twenty five feet away from the individual's feet.

Depending on the individual's height, the above result can be achieved when the lowermost parts of the upper boundaries of the opaque lower regions of the lenses are at a height such that when the individual's head is held erect and stationary, the central part of the individual's visual field is obscured at angles greater than about 9° to 15° below an imaginary horizontal plane at the level of the individual's eyes.

Other objects, details and advantages of the invention will be apparent from the following detailed description when read in conjunction with the drawings.

DETAILED DESCRIPTION OF THE PREFERRED EMBODIMENT

Figure 1:
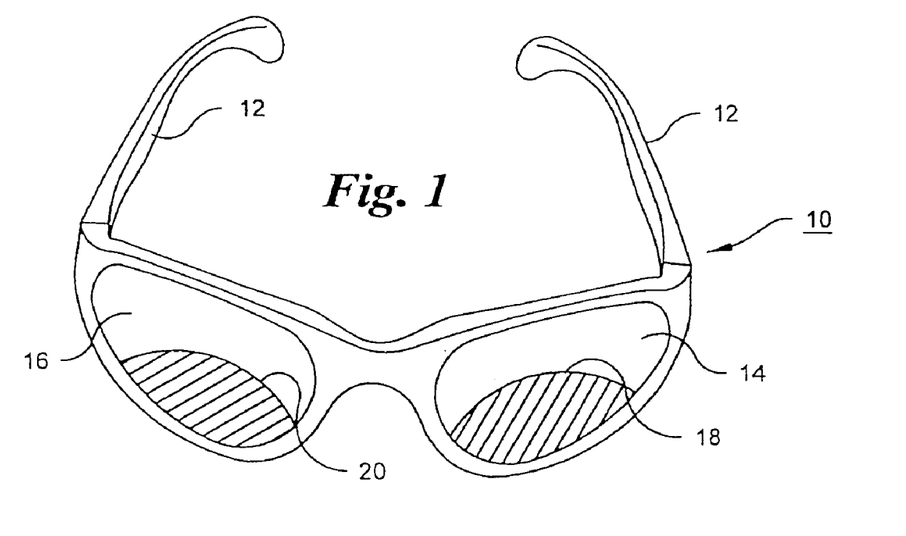
FIG. 1 is a perspective view showing the front of a pair of eyeglasses equipped with opaque film layers in accordance with the invention.
Figure 2:
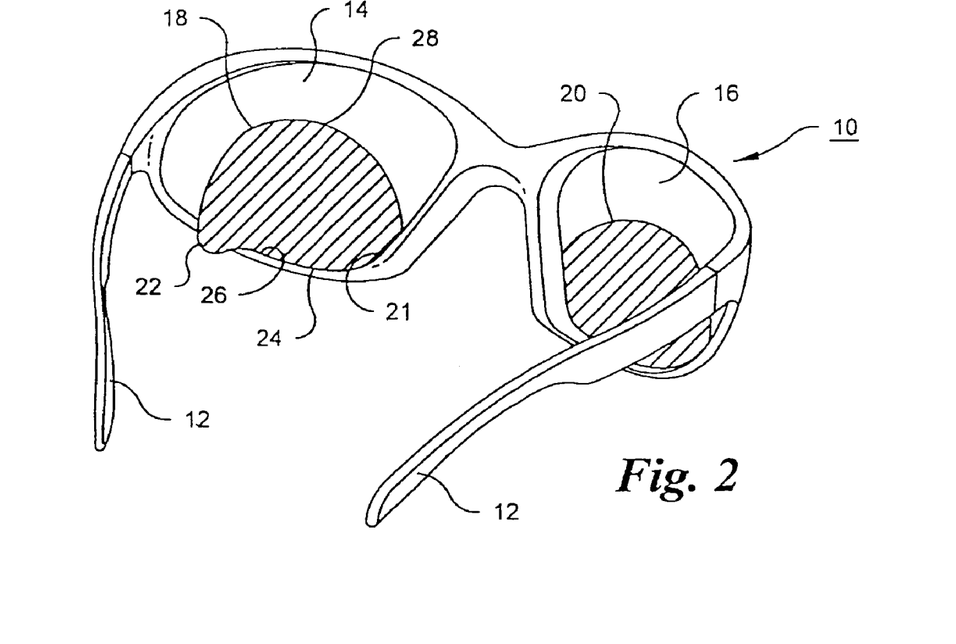
FIG. 2 is a perspective view showing the rear of the eyeglasses of FIG. 1, and showing one of the opaque film layers partially peeled from one of the lenses.

FIGS. 1 and 2 show an eyeglass frame 10, having side members 12 which extend past the wearer's temples and over the ears. The frame has a pair of transparent lenses 14 and 16. The construction of the eyeglasses is conventional. The frames are preferably composed of a high strength resin and may be metal-reinforced. The side members may be spring-loaded, or inherently resilient in order to exert a gentle force on the sides of the wearer's head to hold the frame in place. The lenses should be hard coated, and composed of optical grade, impact and scratch-resistant polycarbonate. Preferably, the lenses are tinted and polarized, and made from a composition affording a high degree of ultraviolet protection.

Opaque film layers 18 and 20 adhere to the lower region of the lenses 14 and 16 respectively, covering at least part of the lower region of each lens while leaving the upper region uncovered and transparent. The film layers are preferably composed of a soft polyvinylidene resin, and adhere to the inside faces of the lenses, as shown in FIG. 2, by electrostatic attraction. Thus, the film layers can be secured to the inside faces of the lenses without the use of an adhesive, and readily peeled away from the lenses.

As shown in FIG. 2, the width of layer 18 extends from its rightmost part 21 to its leftmost part 22. A lower edge 24 extends across substantially the entire width of the film layer 18, and preferably conforms in shape to, and coincides with, the lower edge 26 of lens 14. The lower edge of film layer 20 similarly coincides with and conforms to the lower edge of lens 16. Therefore, as best seen in FIG. 1, the lower edge of each film layer extends along a major part of the lower edge of the lens to which it adheres. Ordinarily, the lower edge of the lens will be downwardly convex, that is, its curvature is such that its lowermost part is located centrally, and the edge progresses upward continuously on both sides of the lowermost part. The lowermost part of the film layer has an identical, downwardly convex, curvature.

The upper edge 28 of film layer 18 has an upwardly convex curvature, and consequently the film layer obscures a vertically higher portion of the central part of the visual field than of the left and right portions of the visual field. The film layer therefore allows the player a high degree of peripheral vision while obscuring a relatively large part of the lower portion of the central visual field.

The downwardly convex lower edge 24 of film layer 18, which extends across substantially the entire width of the film layer has a more gradual curvature than that of the upwardly convex upper edge 28, which also extends across substantially the entire width of the film layer. Preferably, the radii of curvature of all portions of the lower edge 26 are greater than the radii of curvature of all portions of the upper edge 28. The corners at the rightmost and leftmost parts of the film layer have a very small radius of curvature.

Figure 3:
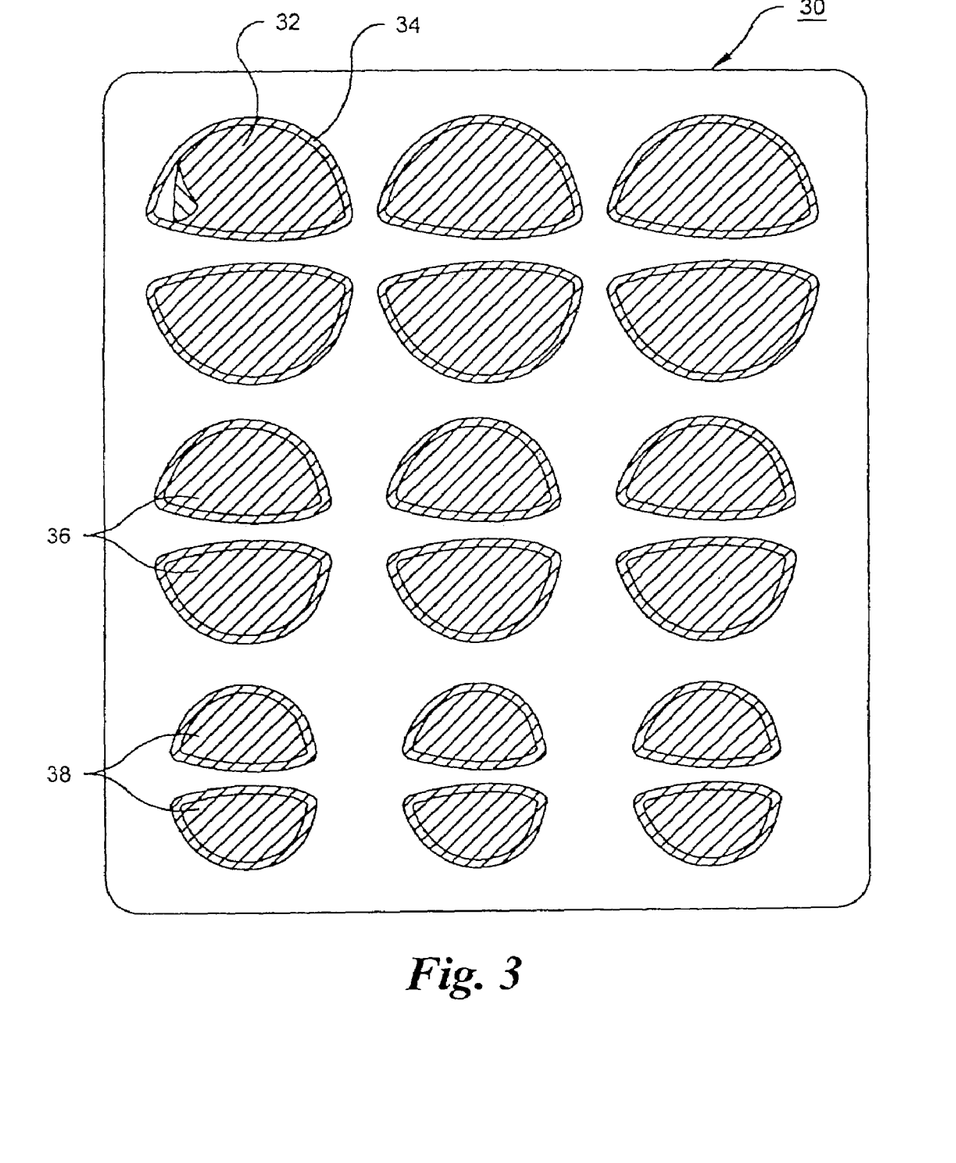
FIG. 3 is a plan view of a sheet having a backing layer and a plurality of pairs of opaque layers of film supported thereon and peelable therefrom, for use in baseball training.

The opaque film is supplied on a laminated sheet composed of a paper backing, a release layer, and a film layer. The opaque regions are printed on the film, and cut in the appropriate size and shape. As shown in FIG. 3, a rectangular sheet 30 has nine pairs of peelable films, provided in three different sizes. One of the peelable films, 32, is shown partially peeled away from the backing. The size of each of the opaque printed regions is slightly larger than the size of the die-cut portion thereof, leaving a narrow margin 34 to allow for possible misalignment of the sheet as it moves from the printing stage to the die-cutting stage in the manufacturing process.

The player will normally begin by applying a pair of the largest films to the lenses of a pair of glasses. While wearing the glasses, the player should have another individual throw slow ground balls from a distance of about ten paces. At first, the player may lose sight of the ball as it approaches, but eventually, the player will learn to follow the ball visually all the way into the glove. This exercise should be repeated until the player is able to catch ground balls consistently.

Next, slow grounders should be thrown to the player's right and left, repeating until the player is able to catch them consistently. Then, the throws can be mixed, some being thrown to the left, others thrown to the right, and others directly toward the player. The convex curvature of the upper edges of the films provides the player with a larger field of vision to either side of center, so that balls thrown to the right or left can be caught more easily.

As the player's confidence builds, balls can be thrown toward the player in the air, following the same patterns as described for ground balls.

Once the player is fielding slowly thrown balls consistently, the balls can be thrown at higher speed. When the player is confident that he or she is visually following the ball into the glove consistently, smaller films, e.g. films 36, can be substituted for the large films. Eventually, after some practice with the smallest films 38, the training aid will not be needed.

The training aid should not be used to field batted balls or balls projected by a throwing machine. It is unnecessary to practice with fast moving balls. In time, the player's ability to field the hard hit balls will become automatic just as in the case of slowly thrown balls.

The training aid should not be used in a game or in practice where a throw may come unexpectedly from any direction. In this case, the opaque films should be removed, and the player may wear the glasses as protective eyewear without the films.

The training aid can be used in a similar manner in practicing catching throws at first base, especially low throws that hit the ground before being caught. Similarly, the training aid can also be used by a catcher to practice catching or blocking errant pitches, especially low pitches that hit the ground in front of the catcher.

Figure 4:
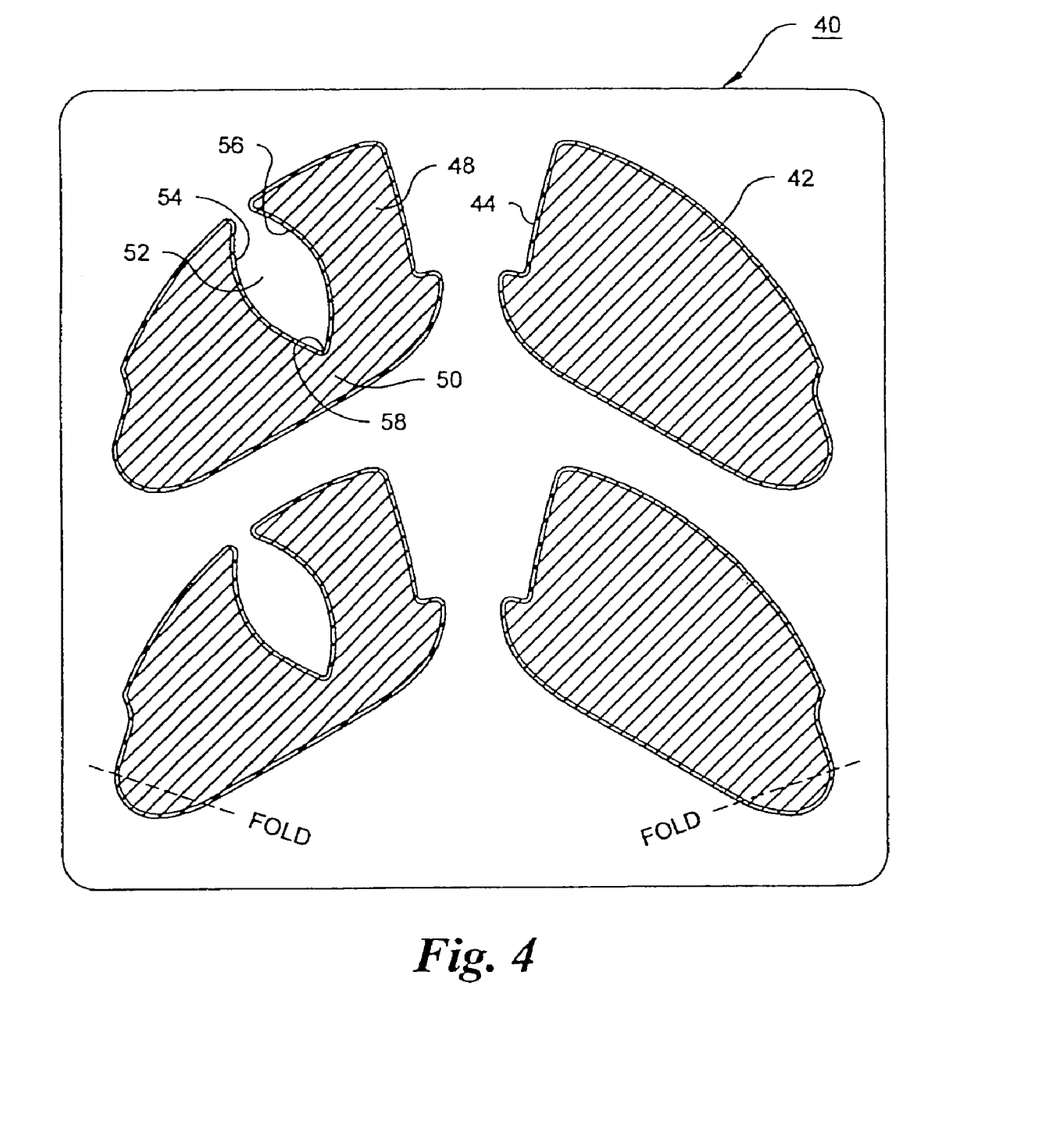
FIG. 4 is a plan view of a sheet having a backing layer and a plurality of pairs of opaque layers of film supported thereon and peelable therefrom, for use in golf training.

As shown in FIG. 4, the films for golf training are similarly provided as parts of a laminated sheet 40, comprising a paper backing, a release layer and a printed, die-cut film.

Two identical pairs of films are provided. One of the pairs consists of a first element 42, which is designed to render the entirety of one of the lenses of a pair of eyeglasses opaque. The element 42 is set back at 44 to accommodate a nosepiece (not shown) of the eyeglasses to which it is to be attached, and has a rounded projection 46 to cover a similarly configured projecting portion of the eyeglass lens. The other element 48 has an outline which is a mirror image of the outline of element 42. The outlines of the elements, of course, can differ from the specific outlines shown in order to conform to different eyeglass lens shapes.

The lower part 50 of element 48 is continuous from the right side to the left side of element 48, so that it obscures the entire lower part of the field of vision of the eye. A lenticular opening 52 is provided in the upper portion of the element 48 approximately midway between the right and left sides. The sides 54 and 56 of the lenticular opening diverge, proceeding upward from a lowermost point 58, and then converge. The border of the lenticular opening may be discontinuous at the upper end, as shown.

As shown in FIG. 4, fold lines are printed on the film to indicate to the user where the backing sheet should be bent in order to begin peeling the films away from the backing.

The manner in which the elements 42 and 48 are applied to a pair of eyeglasses depends on whether the golfer is right-handed or left-handed. A right-handed golfer, assuming he has good vision in both eyes, will apply the fully opaque film element 42 to the right-hand lens of the eyeglasses, and the film element 48, having the lenticular opening, to the left-hand lens. A left-handed golfer will do the opposite. Because the films adhere electrostatically to the lenses of the eyeglasses, either the front or the back surface of a film can be placed against an eyeglass lens.

In the case of the right-handed golfer, the lenticular opening will allow the golfer's left eye to view a ball on the ground (or on a tee). The lenticular shape of opening 52 encourages the golfer to keep his or her head down, in a position to afford maximum visibility to the left and right of the ball. If the golfer's head is moved more than a very short distance to the left or right, the ball can no longer be seen. However, the golfer can move his or her eyes to the right or left, and still see the ball, so long as the head is held steady.

Locating the film element having the opening over the forward eye (the eye closest to the target) ensures that the golfer's head will stay behind the ball during the downswing.

The golf training aid has been found effective for teaching golfers to hit the ball straight consistently, by preventing the golfer from seeing the ball when the head is lifted or shifted laterally forward or backward along the target line.

To use the golf version of the training aid, the film elements should be placed on the inside faces of the lenses of the glasses, with the edge of each film element against the nose side edge of the lens to which it is attached. The golfer should not try complete swings at first. Rather, he or she should start with very slow, very short, back swings, returning the club head to the hitting position each time. This exercise should be repeated until it can be carried out consistently without losing sight of the ball even for an instant.

The length of the back swing should then be gradually increased until the maximum backswing is reached that can be achieved without losing sight of the ball. This will become increasingly difficult for a golfer who is not very flexible in the back, neck or shoulders. However, a shorter maximum backswing will be more than compensated for by improvement in the golfer's ability to hit shots squarely with the center of the clubface.

When the golfer is confident about his or her ability to make the backswing without losing sight of the ball, slow, easy full swings can commence. This motion should be repeated until the golfer becomes accustomed to the view and feel of having the head behind the ball at impact.

Training should be continued by wearing eyeglasses with the vision restricting films on a golf course. At first, the golfer may find that by restricting the swing somewhat in order to stay behind the ball, some shots may be missed, and the ball may not travel as far as desired. These weak or missed shots will be overcome with time. Distance and consistency will improve greatly as more shots are hit squarely with the middle of the club face, and much less effort will be required to achieve a given distance.

Practicing for only ten minutes a day for one month will give most golfers confidence about their ability to hit the ball straight every time.

Various modifications can be made to the training aids described above. For example, although the peelable films are preferably provided along with a pair of glasses which they match, the films can be provided in various shapes on a single sheet, allowing the player to select films that most closely conform to the shape of the lenses of the player's previously acquired eyewear. In the case of the films designed for golfers, the opening 52, although preferably lenticular in shape as shown in FIG. 4, can be formed in other shapes. However, in each case, the borders of the opening should diverge from each other starting at a lowermost part of the opening spaced from the bottom edge of the film.

Figure 5:
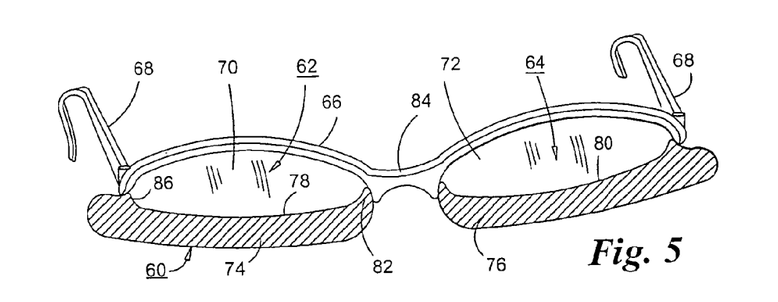
FIG. 5 is a perspective view of a preferred baseball and softball training aid in accordance with the invention.

The training aid shown in FIG. 5 comprises a pair of eyeglasses 60, preferably having impact-resistant lenses 62 and 64, composed of transparent polycarbonate resin or other suitable material. The lenses are preferably hard coated, and composed of optical grade, impact and scratch-resistant polycarbonate. Preferably, the lenses are made from a composition affording a high degree of ultraviolet protection. The lenses may be tinted and/or polarized to reduce the effects of glare caused by the sun or bright artificial lights. Moreover, if required by the user, the lenses may be prescription lenses.

The lenses are fitted to a suitable frame 66, which is preferably composed of a high strength resin. The frames may be metal-reinforced. The frame shown has hinged earpieces 68. The earpieces may be spring-loaded, or inherently resilient in order to exert a gentle force on the sides of the wearer's head to hold the frame in place. Alternative means for attachment of the frame to the user's head can be used. For example an adjustable, or elastic, band (not shown) can be provided in place of the earpieces. The eyeglasses described thus far can be conventional, impact-resistant, sunglasses. The sunglass lenses are preferably shaped so that they extend from the wearer's nose respectively to locations sufficiently far to the right and left that no light passing to the right or left of the sunglasses can reach the wearer's eyes directly. So-called "wrap-around" sunglasses are suitable for this purpose.

As shown in FIG. 5, upper regions 70 and 72 of the lenses are transparent, but the lower regions 74 and 76 are opaque. The upper and lower regions of each lens are approximately equal in area. Each of the opaque lower regions is characterized by a concave upper boundary. That is, the upper boundary at which each opaque lower region of each lens meets the transparent upper region of the lens is concave. Boundary 78 is the concave upper boundary of opaque region 74, and boundary 80 is the concave upper boundary of opaque region 76. For example, as shown in FIG. 5, region 74 has a part 82, adjacent the nose bridge 84, which extends upward, and another part 86, adjacent the wearer's right earpiece 68, which similarly extends upward. The concavity of the upper boundaries 78 and 80 is such that the sides of the visual field the wearer are occluded to a greater degree than the central part of the user's visual field. The upper edge of each opaque region preferably has a smooth curvature in order to minimize annoyance to the wearer. However, various other concave shapes incorporating straight lines and step-like shapes can be used, provided that the left and right parts of the opaque region of each lens are higher than the central part.

The opaque regions can be formed by incorporating an opaque dye into the lens material in the process of forming the lenses. Preferably, however, the opaque regions are formed by adhering an opaque film to one of the outer and inner faces of each lens. The film is preferably composed of a soft polyvinylidene resin, and adheres to the lenses by electrostatic attraction. Preferably, the films are attached to the inside faces of the lenses, that is, the sides of the lenses facing the wearer, so that the films are less likely to be damaged or unintentionally peeled away from the lenses.

The frame of the eyeglasses should be shaped so that the central parts of the upper boundaries of the opaque regions are slightly below the level of the wearer's pupils, while the left and right parts (e.g., parts 82 and 86) extend slightly above the level of the pupils.

Figure 6:
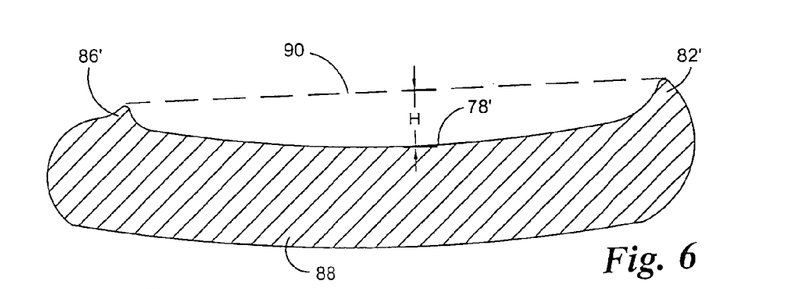
FIG. 6 is an elevational view of an opaque film layer defining the shape of an opaque lower region of one of the lenses of the training aid of FIG. 5.

FIG. 6 shows a film 88, used to make the lower region 74 of lens 62 opaque, and has a concave upper boundary 78' corresponding to boundary 78 of the opaque region 74 in FIG. 5. As shown in FIG. 6, parts 82' and 86' of the film, which correspond to parts 82 and 86 of the opaque region of lens 62 as shown in FIG. 5, extend upward so that an imaginary line 90, drawn from the tip of part 82', at one end of the concave upper boundary 78', to the tip of part 86' at the other end of concave boundary 78', is spaced from the central part of the upper boundary by a distance H. This distance H should be at least 0.5 centimeters, and is preferably about 1.0 centimeter.

Figure 7:
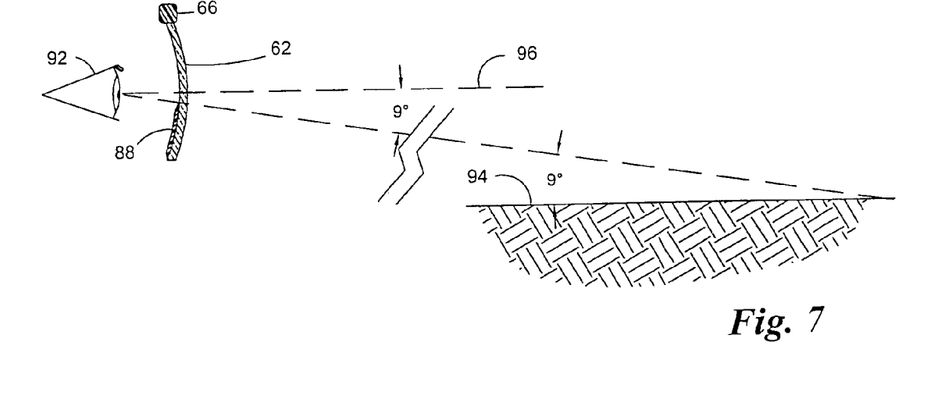
FIG. 7 is a schematic side elevational view of the training aid of FIGS. 5 and 6, illustrating the manner in which the training aid of the invention limits the height of the central part of a user's visual field.

As shown in FIG. 7, a lens 62, in a frame 66, is positioned in front of the eye 92 of a user, who is assumed to be about four feet, five inches tall and standing on a flat playing field 94. The upper boundary of the film 88 on the inner face of the lens 62 is disposed with respect to the user's pupil so that when the user's head is erect, the user can see straight ahead along imaginary horizontal line 96, and downward from that imaginary horizontal line to an angle of about 9°. The user's eye level will be about four feet from the playing surface, and accordingly, the horizontal distance from the player's feet to the nearest visible point on the playing field will be approximately $$\frac{4'}{\tan 9°},$$

or approximately 25 feet. To achieve this range, assuming the lens is approximately 1.5 cm in front of the user's eye, the central part of the upper edge of the opaque film will be about 0.25 cm below horizontal line 96, or about midway between edge 78' and imaginary line 90, assuming H is 0.5 cm.

In another example, in the case of a very tall player, whose eyes are at a height of six feet, seven inches, the twenty five foot limit on visibility will be achieved if the central part of the opaque region prevents the user from seeing at an angle greater than about 15° below horizontal line 96. In this case, $$\frac{6'7''}{\tan 15°} \cong 25 \text{ feet.}$$

Here, the central part of the upper edge of the opaque film will be about 0.4 cm below imaginary line 96 in FIG. 7. If line 96 passes midway between edge 78' and line 96, dimension H will be 0.8 cm.

A player whose height is shorter than approximately four feet, five inches, and who is wearing a training aid designed to obscure vision at angles greater than 9° below the horizontal, will be able to see the ground at a distance significantly less than 25 feet away while his head is held erect. However, such a player is likely to be a younger player, who will be fielding balls approaching him relatively slowly. Therefore, it is not necessary to design the training aid in such a way that the angle is less than 9° to accommodate players shorter than approximately four feet, five inches.

The heights of parts 82' and 86' of the opaque film can be such that dimension H can be 1.0 cm or even more, regardless of the height of the person using the training aid. Good results can be achieved when dimension H is about 1.0 cm. A dimension H of at least about 1.0 cm is preferred for reasons that will be explained below.

As in the case of the previously described embodiment, in practicing fielding, a user, while wearing the training aid, should have another individual throw slow ground balls. At first, the player may lose sight of the ball as it approaches, but eventually, the player will learn to follow the ball visually all the way into the glove. This exercise should be repeated until the player is able to catch ground balls consistently.

Next, slow grounders should be thrown to the player's right and left, repeating until the player is able to catch them consistently. Then, the throws can be mixed, some being thrown to the left, others thrown to the right, and others directly toward the player. As the player's confidence builds, balls can be thrown toward the player in the air, following the same patterns as described for ground balls. The training aid can be used in practicing catching throws at first base, especially low throws that hit the ground before being caught. Similarly, the training aid can also be used by a catcher to practice catching or blocking errant pitches, especially low pitches that hit the ground in front of the catcher.

In practicing batting, the same training aid can be worn without modification. Because the left and right portions of the opaque areas are higher than the central part, the user will find that tilting his or her head to the right while in a right-handed batting stance (or to the left if in a left-handed stance) will cause the higher portions of the opaque areas to interfere with his or her visual field, and that the only way to prevent this from happening is to maintain the head upright while awaiting a pitch and while swinging the bat. Holding the head upright will, in turn, result in a level, more effective, swing, producing more hits.

Referring again to FIG. 6, a dimension H of about 1.0 cm is preferred because it ensures that the left and right portions of the opaque region extend sufficiently above line 44 to enable the training aid to perform its proper function during batting practice. H should be about 1.0 cm, and preferably not much greater than 1.0 cm, e.g., not more than 1.5 cm, because, if the heights of the right and left portions of the opaque region are too great, they will interfere with the user's right and left vision during fielding, even when the user's head is down, as it should be when retrieving a ground ball.

As will be apparent, the training aid in accordance with the invention has the advantage that it can be used effectively both for training in fielding and for training in batting. Thus, a player does not need to change eyewear during a practice session involving both fielding and batting. After a number of practice sessions, the player will find that he or she is better able to field ground balls, low throws and low line drives, and to swing the bat more effectively. Eventually, after some practice the training aid will not be needed. The opaque films can be removed, and the glasses may then be used as conventional sunglasses.

The training aid should not be used to field batted balls or balls projected by a throwing machine. It is unnecessary to practice with fast moving balls. In time, the player's ability to field the hard hit balls will become automatic just as in the case of slowly thrown balls.

The training aid should not be used in a game or in practice where a throw may come unexpectedly from more than one direction. In this case, the opaque films should be removed, and the player may wear the glasses as protective eyewear without the films. The films may be stored and re-attached to the lenses, if necessary. Alternatively new films may be used, and to this end, a number of films may be supplied on a sheet, from which they can be peeled off as needed.

Various modifications can be made to the training aid as shown and described. For example, the training aid can be supplied with peelable opaque films already in place on the lenses, or alternatively as a kit comprising a pair of sunglasses with one or more sets of opaque film on a sheet from which they can be peeled away for attachment to the sunglasses. As a further alternative, opaque films can be supplied for use with various kinds of sunglasses, which can be obtained separately. The shapes of the sunglass frames and lenses can vary. For example, although the rims in the embodiment shown extend all the way around the lenses, the sunglasses can be of the kind in which lenses depend from a frame structure that extends only across the upper parts of the lenses.

Still other modifications may be made to the apparatus and method described above without departing from the scope of the invention as defined in the following claims.

We claim:

1. A method of training an individual in fielding and hitting baseballs or softballs, in which said individual is caused to wear a training aid comprising:
    an eyeglass frame having a pair of lenses, each lens having a transparent upper region and an opaque lower region;
    the opaque lower region of each of said lenses having an upper boundary at which it meets the transparent upper region of the lens, said boundary being concave;
    whereby the sides of the visual field of a user of the training aid are occluded to a greater degree than the central part of the user's visual field,
    the training aid being positioned on the individual's face with the lowermost parts of said upper boundaries of the opaque lower regions of the lenses at a height such that, when the individual is standing on a level playing field and the individual's head is held erect, the individual can see, in the central part of the visual field, portions of the playing field more than approximately twenty-five feet from the individual's feet, but is prevented from seeing portions of the playing field less than approximately twenty five feet away from the individual's feet unless he tilts his head down, and
    in which baseballs or softballs are projected toward said individual for fielding or hitting.

2. A method of training an individual in fielding and hitting baseballs or softballs, in which said individual is caused to wear a training aid comprising:
    an eyeglass frame having a pair of lenses, each lens having a transparent upper region and an opaque lower region;
    the opaque lower region of each of said lenses having an upper boundary at which it meets the transparent upper region of the lens, said boundary being concave;
    whereby the sides of the visual field of a user of the training aid are occluded to a greater degree than the central part of the user's visual field,
    the training aid being positioned on the individual's face with the lowermost parts of said upper boundaries of the opaque lower regions of the lenses at a height such that when the individual's head is held erect, the central part of the individual's visual field is obscured at angles greater than an angle in the range from about 9° to 15° below an imaginary horizontal plane at the level of the individual's eyes, and
    in which baseballs or softballs are projected toward said individual for fielding or hitting.

* * * * *